United States Patent
Young et al.

(10) Patent No.: US 10,163,245 B2
(45) Date of Patent: Dec. 25, 2018

(54) MULTI-MODE ANIMATION SYSTEM

(71) Applicant: Microsoft Technology Licensing, LLC, Redmond, WA (US)

(72) Inventors: Anthony R. Young, Sammamish, WA (US); Lindsay Ann Kubasik, Seattle, WA (US); Mark Lee Aldham, Seattle, WA (US); Nathan P. Pollock, Seattle, WA (US); Jeffrey E. Stall, Kirkland, WA (US); Peter Auerhann Beissinger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/196,816

(22) Filed: Jun. 29, 2016

(65) Prior Publication Data
US 2017/0278291 A1   Sep. 28, 2017

Related U.S. Application Data

(60) Provisional application No. 62/313,595, filed on Mar. 25, 2016.

(51) Int. Cl.
| | |
|---|---|
| *G06T 13/00* | (2011.01) |
| *G06T 13/80* | (2011.01) |
| *G06F 3/0488* | (2013.01) |
| *G06F 8/38* | (2018.01) |
| *G06F 9/451* | (2018.01) |

(52) U.S. Cl.
CPC .......... *G06T 13/80* (2013.01); *G06F 3/0488* (2013.01); *G06F 8/38* (2013.01); *G06F 9/451* (2018.02)

(58) Field of Classification Search
CPC ..................................................... G06T 13/00
USPC ........................................................ 345/473
See application file for complete search history.

(56) References Cited

U.S. PATENT DOCUMENTS 5,712,964 A * 1/1998 Kamada ................ G06T 13/00
                                                                345/418
7,164,423 B1 * 1/2007 Westen ................ G06Q 10/107
                                                                345/473

(Continued)

OTHER PUBLICATIONS

Oh, et al., "Moving Objects with 2D Input Devices in CAD Systems and Desktop Virtual Environments", In Proceedings of Graphics Interface, May 9, 2005, 8 pages.

(Continued)

*Primary Examiner* — Phong Nguyen
(74) *Attorney, Agent, or Firm* — Fiala & Weaver P.L.L.C.

(57) ABSTRACT

Animations are displayed on a user interface (UI) of a computing device using one of multiple different animation system modes, each animation system mode operating in a different manner to determine how to change the display for an animation. The animation can be on a particular object that is displayed by the computing device (e.g., scrolling a list, moving an icon or character from one location to another) and/or can be on the display as a whole (e.g., panning or scrolling a view of the whole display). The multi-mode animation system operates to select an animation system mode on a frame by frame basis. For each frame of content being displayed on the display device, the multi-mode animation system selects an appropriate one of the animation system modes to use for generating the content of that frame.

20 Claims, 6 Drawing Sheets

(56) References Cited

U.S. PATENT DOCUMENTS

| | | | |
|---|---|---|---|
| 7,403,202 B1* | 7/2008 | Nash | G06T 13/40 |
| | | | 345/474 |
| 8,250,494 B2 | 8/2012 | Butcher et al. | |
| 8,866,822 B2 | 10/2014 | Carter et al. | |
| 8,887,103 B1 | 11/2014 | Bi et al. | |
| 8,922,499 B2 | 12/2014 | Westerman | |
| 9,196,075 B2 | 11/2015 | Borysenko et al. | |
| 2004/0189646 A1* | 9/2004 | Hayashi | G06T 13/80 |
| | | | 345/473 |
| 2005/0270294 A1* | 12/2005 | Le Tuan | G06T 13/00 |
| | | | 345/473 |
| 2009/0079744 A1* | 3/2009 | Chen | G06T 13/80 |
| | | | 345/473 |
| 2009/0315839 A1* | 12/2009 | Wilson | G06F 17/5009 |
| | | | 345/173 |
| 2011/0012903 A1* | 1/2011 | Girard | G06T 13/40 |
| | | | 345/474 |
| 2011/0099492 A1* | 4/2011 | Park | G06F 3/0481 |
| | | | 715/764 |
| 2011/0163944 A1 | 7/2011 | Bilbrey et al. | |
| 2011/0193788 A1 | 8/2011 | King et al. | |
| 2011/0202834 A1 | 8/2011 | Mandryk et al. | |
| 2011/0216076 A1* | 9/2011 | Kim | G06T 13/00 |
| | | | 345/473 |
| 2011/0227929 A1* | 9/2011 | Furtwangler | G06T 13/00 |
| | | | 345/473 |
| 2012/0306891 A1* | 12/2012 | Shaffer | G06T 13/00 |
| | | | 345/473 |
| 2013/0050224 A1* | 2/2013 | Gehani | G06T 13/80 |
| | | | 345/473 |
| 2013/0083037 A1* | 4/2013 | Rodgers | G06T 13/80 |
| | | | 345/474 |
| 2013/0086516 A1 | 4/2013 | Rodgers | |
| 2013/0344961 A1* | 12/2013 | Iannetta | G09G 5/026 |
| | | | 463/36 |
| 2014/0053113 A1 | 2/2014 | Zoon et al. | |
| 2014/0111678 A1* | 4/2014 | Vikram | H04N 5/23245 |
| | | | 348/333.01 |
| 2014/0218370 A1* | 8/2014 | Mishra | G06T 13/00 |
| | | | 345/473 |
| 2014/0225898 A1* | 8/2014 | Fyke | G06T 11/00 |
| | | | 345/473 |
| 2015/0154785 A1* | 6/2015 | Grossman | G06T 13/80 |
| | | | 345/474 |

OTHER PUBLICATIONS

"International Search Report and Written Opinion", Application No. PCT/US2017/023282, dated Jun. 1, 2017, 12 pages.

"Key Frame—Wikipedia", Retrieved from: https://en.wikipedia.org/w/index.php?title=Keyframe&oldid=446405635—on Jul. 1, 2016, 6 pages.

* cited by examiner

MULTI-MODE ANIMATION SYSTEM

RELATED APPLICATIONS

This application claims priority under 35 U.S.C. Section 119(e) to U.S. Provisional Application No. 62/313,595, filed Mar. 25, 2016 and titled "Multi-Mode Animation System", the entire disclosure of which is hereby incorporated by reference.

BACKGROUND

As computing technology has advanced, various different techniques for interacting with computers have been developed. However, some interactions are managed by computers in a manner that can be slow and inefficient, leading to delays or lags in interactions and/or significant usage of computer resources (e.g., memory, processing power). This can lead to poor user experiences and user frustration with the computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a command for a display system is received. On a frame by frame basis for content displayed by the display system as part of a user interface, one of multiple animation system modes for the display system is selected based at least on the command, and a display of the content for a current frame is updated using the selected animation system mode.

In accordance with one or more aspects, a system includes a selection module and an additional module. The selection module is configured to receive a command for the system and, on a frame by frame basis for content displayed by the system, select one of multiple animation system modes for the system based at least on the command. The additional module corresponding to the selected animation system mode and configured to update a display of the content for a current frame of the content using the selected animation system mode.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A multi-mode animation system is discussed herein. Animations are displayed by a computing device using one of multiple different animation system modes, each animation system mode operating in a different manner to determine how to change the display for an animation. An animation as used herein refers to changing the data displayed on a display device (e.g., a screen) to reflect a movement or action. The animation can be on a particular object that is displayed by the computing device (e.g., scrolling a list, moving an icon or character from one location to another) and/or can be on the display as a whole (e.g., panning or scrolling a view of the whole display).

The multi-mode animation system operates to select an animation system mode on a frame by frame basis. The content displayed on the display device is frame-based content, with multiple different frames being displayed every second (e.g., 30 frames per second or 60 frames per second). For each frame of content being displayed on the display device, the multi-mode animation system selects an appropriate one of the animation system modes to use for generating the content of that frame.

The multi-mode animation system (also referred to herein as a display system) maintains a current state of the display system, the current state including data or information used by the animation system modes. This current state is shared across the animation system modes, allowing each animation system mode to use data or information generated or updated by another animation system mode. The current state can be, for example, a velocity of an animation, a location or position of an object or animation, and so forth.

The techniques discussed herein provide a seamless, efficient manner for displaying animations. For each frame, an appropriate animation system mode for generating the frame is selected (e.g., an animation system mode that can most efficiently generate the frame is selected). The multi-mode animation system can also seamlessly change between animation system modes, allowing the animation to be displayed smoothly and seamlessly despite the change in animation system modes.

Figure 1:
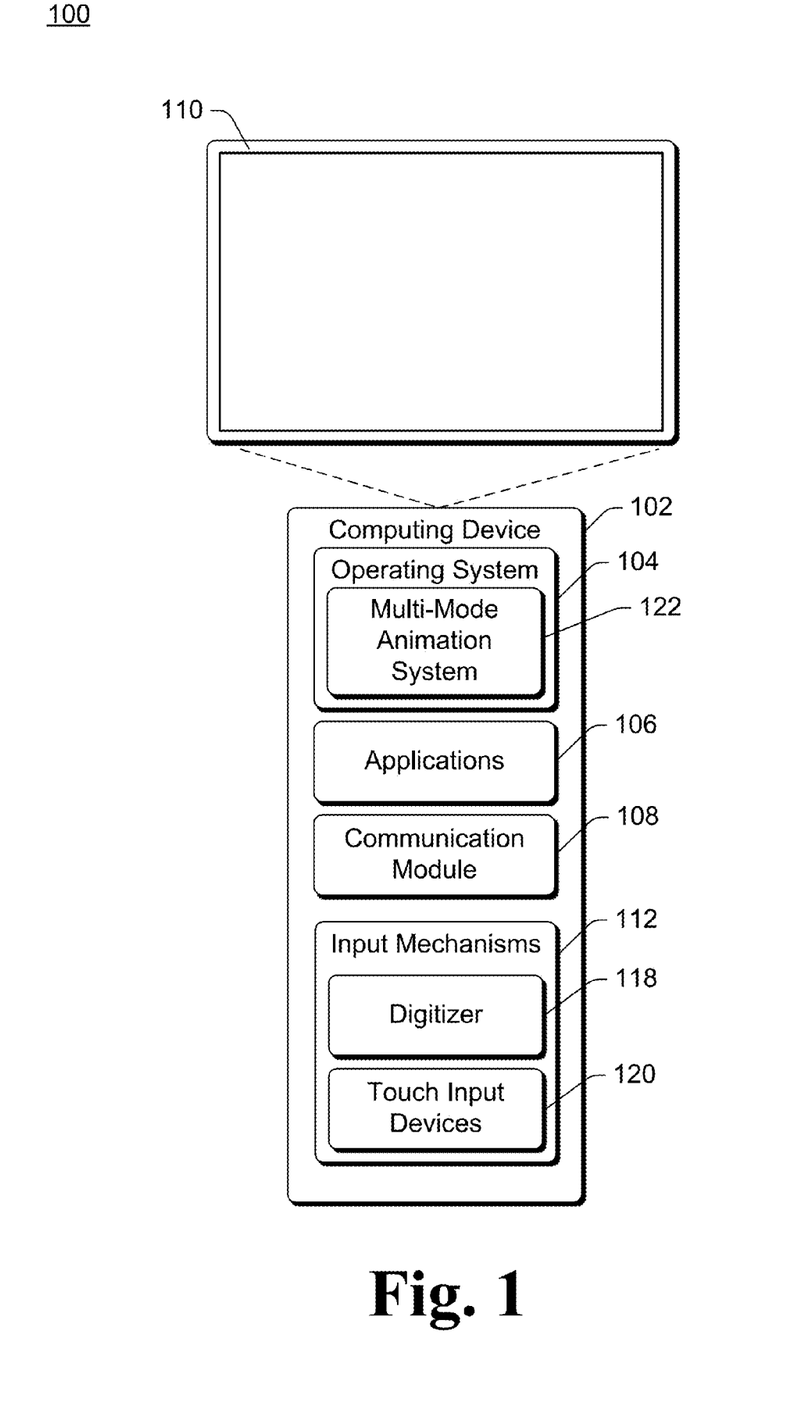
FIG. 1 illustrates an example environment in which the multi-mode animation system discussed herein can be used.

FIG. 1 illustrates an example environment 100 in which the multi-mode animation system discussed herein can be used. The environment 100 includes a computing device 102 that can be embodied as any suitable device such as, by way of example, a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a variety of different functionalities that enable various activities and tasks to be performed. For instance, the computing device 102 includes an operating system 104, multiple applications 106, and a communication module 108. Generally, the operating system 104 is representative of functionality for abstracting various system components of the computing device 102, such as hardware, kernel-level modules and services, and so forth. The operating system 104, for instance, can abstract various components of the computing device 102 to the applications 106 to enable interaction between the components and the applications 106.

The applications 106 represent functionalities for performing different tasks via the computing device 102. Examples of the applications 106 include a word processing application, an information gathering and/or note taking application, a spreadsheet application, a web browser, a gaming application, and so forth. The applications 106 may be installed locally on the computing device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the computing device 102 to communicate over wired and/or wireless connections. For instance, the communication module 108 represents hardware and logic for communication via a variety of different wired and/or wireless technologies and protocols.

The computing device 102 further includes a display device 110 and input mechanisms 112. The display device 110 generally represents functionality for visual output for the computing device 102. Additionally, the display device 110 optionally represents functionality for receiving various types of input, such as touch input, pen input, and so forth. The input mechanisms 112 generally represent different functionalities for receiving input to the computing device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the display 110; integral examples include gesture-sensitive displays with integrated touch-sensitive or motion-sensitive sensors. The input mechanisms 112 optionally include a pen digitizer 118 and/or touch input devices 120. The pen digitizer 118 represents functionality for converting various types of input to the display device 110 and/or the touch input devices 120 into digital data that can be used by the computing device 102 in various ways, such as for generating digital ink, panning or zooming the display of data, and so forth. The touch input devices 120 represent functionality for providing touch input separately from the display 110.

Although reference is made herein to the display device 110 receiving various types of input such as touch input or pen input, alternatively the display device 110 may not receive such input. Rather, a separate input device (e.g., a touchpad) implemented as a touch input device 120 can receive such input. Additionally or alternatively, the display device 110 may not receive such input, but a pen can be implemented as a touch input device 120, and the pen provides an indication of the input rather than the input being sensed by the display device 110.

Input can be provided by the user in any of a variety of different manners. For example, input can be provided using an active pen that includes electronic components for interacting with the computing device 102 (e.g., a battery that can provide power to internal components of the pen, a magnet or other functionality that supports hover detection over the display device 110, etc.). By way of another example, input can be provided using a stylus without internal electronics, the user's finger, a mouse, audible inputs, hand or other body part motions (e.g., using a camera and/or skeletal tracking), and so forth.

The operating system 104 includes a multi-mode animation system 122. Although illustrated as part of the operating system 104, at least part of the multi-mode animation system 122 can be implemented in other components or modules of the computing device 102 (e.g., as part of a basic input/output system (BIOS)). The multi-mode animation system 122 supports multiple different animation system modes and allows switching between animation system modes for a user interface (UI) presented by the computing device 102. The UI allows various inputs and outputs, optionally including user touch or selection of UI items (e.g., via a touchscreen), display of animations generated by applications 106, and so forth. In one or more embodiments, the multi-mode animation system 122 makes a determination, for each frame of content displayed by the computing device 102, of which animation system mode to use to determine the content to be displayed.

During operation of the computing device 102, visual content is displayed on the display device 110. This visual content is a series or sequence of frames, and the data displayed can vary from frame to frame. Different animations can be used to change the data displayed, such as scrolling through a list, panning around the display, dragging and dropping items, moving characters or icons, and so forth. Each animation changes the data displayed on a display device (e.g., a screen) to reflect a movement or action. In one or more embodiments, the computing device 102 includes a frame buffer or similar structure into which data (e.g., a bitmap) to be displayed on the display 110 is stored. The data displayed for each frame can change as a result of the animation, and the data to be displayed for a particular frame is the data generated by the selected animation system mode for the particular frame.

Animations are performed in response to particular commands. A command refers to an input or directive to perform a particular operation (e.g., to perform an animation, or to perform some other operation that results in an animation). Commands can be of different types and can be received from various different sources, such as an application 106, the user of the computing device, a program of the operating system 104, and so forth. Different types of commands include, for example, application defined animation commands, user interaction commands, inertia commands, and jump commands as discussed in more detail below.

Figure 2:
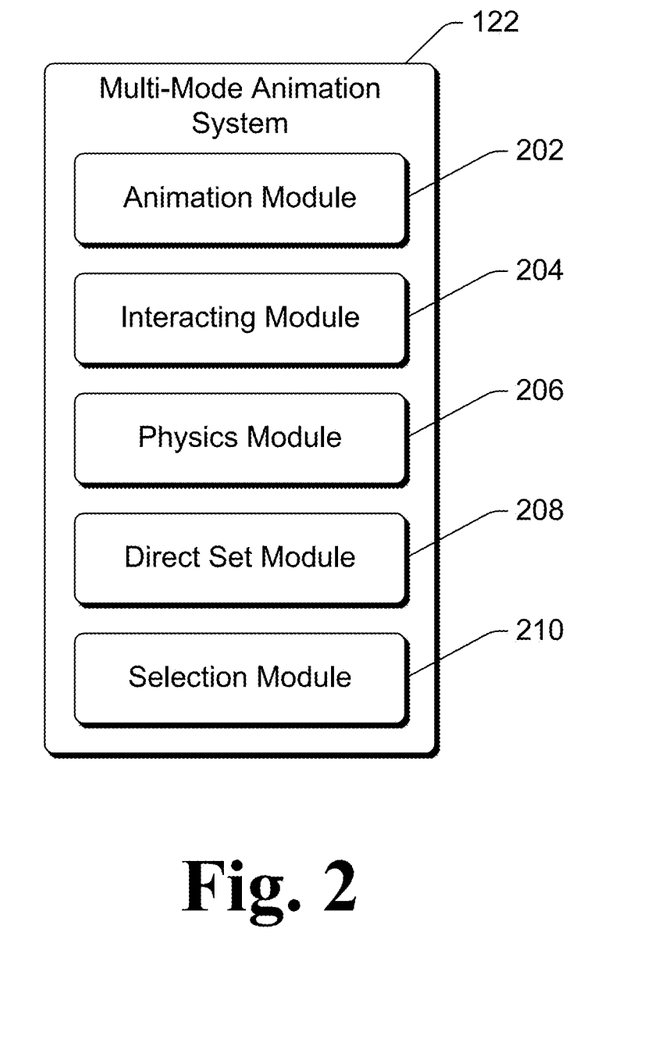
FIG. 2 illustrates an example multi-mode animation system in accordance with one or more embodiments.

FIG. 2 illustrates an example multi-mode animation system 122 in accordance with one or more embodiments. FIG. 2 is discussed with reference to elements of FIG. 1. The multi-mode animation system 122 includes an animation module 202, an interacting module 204, a physics module

206, a direct set module 208, and a selection module 210. Each of these modules implements a different animation system mode.

The animation module 202 implements an application defined animation system mode. In one or more embodiments, the animation module 202 performs key frame animation and/or expression animation as defined or specified by the application 106. The key frame animation and/or expression animation is also referred to as custom animation because the animation is defined or specified by the application 106. The key frame animation refers to an animation that is a time-based or value-based animation in which the particular values (e.g., animating from one value to another) are specified. The expression animation refers to an animation that is a relative animation in which the animation is tied or relative to something else moving on the display (e.g., changing the animation in a particular manner based on the object or other displayed component that the animation is tied to).

The application 106 provides the initial configuration information or settings for the key frame animation and/or expression animation, and then the animation module 202 performs the key frame animation and/or expression animation. Various different configuration information or settings can be provided by the application 106, such as particular values at the beginning of the animation, particular values at the end of the animation, an amount of time (a duration) over which a key frame animation is to be performed, an interpolation (easing) curve between the beginning and ending values for the animation, an object or other displayed component to tie an expression animation to, a manner in which an object is tied to another object or displayed component (e.g., the expression indicating how the object is to move in relation to the other object or displayed component), and so forth.

The interacting module 204 implements a user interaction animation system mode. In one or more embodiments, the interacting module 204 performs animation operations for responding to user inputs. For example, the interacting module 204 may include a state machine for responding to various different user inputs (such as a stick to finger input in which an on-display object touched by the user (e.g., via a touchscreen) moves around the screen as the user moves his or her finger as if the object were glued or stuck to the user's finger). Various different operations can be performed by the interacting module 204, each of which can be customized to provide a good user experience for a particular type of user input.

The physics module 206 implements an inertia animation system mode. In one or more embodiments, the physics module 206 uses one or more physics-based systems to determine updates to the data display for the animation. Such physics-based systems use various different techniques that attempt to model the real world so that objects move in a manner similar or the same as they would move in the real world. For example, such physics-based systems take into account inertia, a dampening system for friction, and so forth. E.g., if a user were to input a flick gesture on a touchscreen to scroll through a list, after the user lifts his or her finger from the touchscreen the physics module 206 can manage the animation so that the scrolling slows down over some period of time. Any of a variety of public and/or proprietary techniques can be used to implement such physics-based systems.

Various initial configuration information or settings for physics-based system are provided to the physics module 206. These can be provided by, for example, the application 106. Various different configuration information or settings can be provided to the physics module 206, such as an initial velocity of the animation, a decay rate of the animation, a current position for the animation, a boundary location for the animation (e.g., where it will end or stop), a boundary feedback motion (e.g., how the animation is to behave when the boundary location is reached, such as by bouncing), user-defined inertia force expressions, and so forth.

The direct set module 208 implements a jump animation system mode. In one or more embodiments, the direct set module 208 directly sets or jumps to a particular data display, typically with no animation. The data to be displayed can be provided to the direct set module 208 (e.g., by the application 106), or can be obtained in other manners (e.g., the application 106 can provide an indication of how the direct set module 208 can determine the particular data display).

As discussed above, the multi-mode animation system 122 maintains a current state of the display system, the current state including data or information used by the animation module 202, interacting module 204, physics module 206, and direct set module 208. This current state is shared across these modules 202, 204, 206, and 208, allowing each of the modules 202, 204, 206, and 208 to use data or information generated or updated by another animation system mode. The current state can be, for example, a velocity of an animation, a location or position of an object or animation, and so forth. This state can be shared across these modules 202, 204, 206, and 208 in various manners, such as storage in a common storage device or other data structure, passing of state by application programming interface (API) methods, and so forth.

It should be noted that although the animation module 202, interacting module 204, physics module 206, and direct set module 208 are illustrated in FIG. 2, not all of these modules need be included in the multi-mode animation system 122. For example, a direct set module 208 may not be included in the multi-mode animation system 122. By way of another example, one or more additional modules providing additional animation functionality may be included in the multi-mode animation system 122.

The selection module 210 selects one of the animation module 202, the interacting module 204, the physics module 206, and the direct set module 208 to update the display of content for any given frame of content. Various different rules or criteria can be used to select the animation system mode, as discussed in more detail below. In one or more embodiments, the selection module 210 also maintains a current state for the multi-mode animation system 122, as discussed above.

Figure 3:
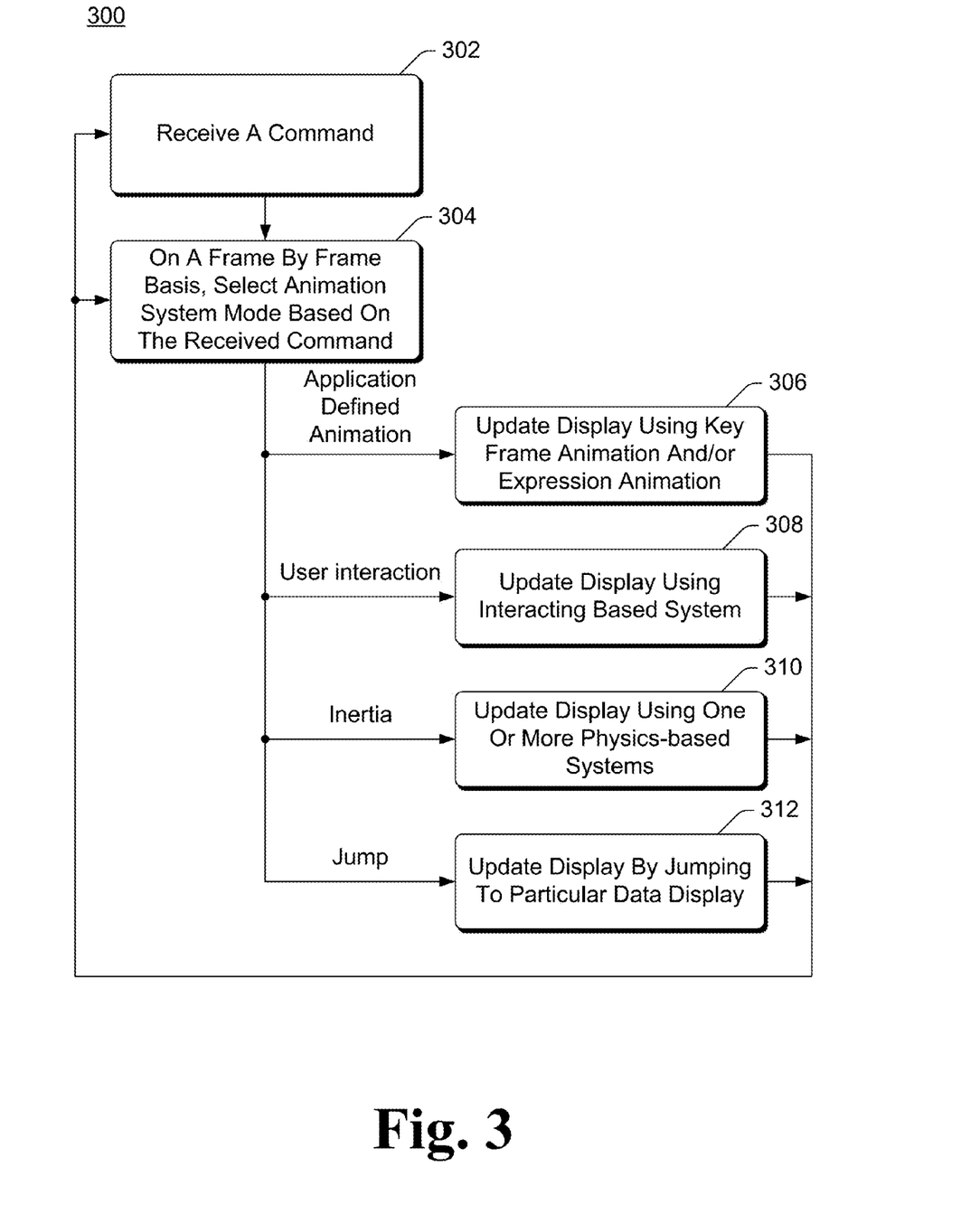
FIG. 3 is a flowchart illustrating an example process for a device implementing a multi-mode animation system in accordance with one or more embodiments.

FIG. 3 is a flowchart illustrating an example process 300 for a device implementing a multi-mode animation system in accordance with one or more embodiments. Process 300 is carried out by a multi-mode animation system, such as the multi-mode animation system 122 of FIG. 1 or FIG. 2, and can be implemented in software, firmware, hardware, or combinations thereof. Process 300 is discussed with reference to FIG. 2. Process 300 is shown as a set of acts and is not limited to the order shown for performing the operations of the various acts. Process 300 is an example process for implementing a multi-mode animation system; additional discussions of implementing a multi-mode animation system are included herein with reference to different figures.

In process 300, a command is received (act 302). A command refers to an input or directive to perform a particular operation (e.g., to perform an animation, or to perform some other operation that results in an animation) as discussed above, and can be received from various different sources as discussed above. For example, a command can be received from the application 106. By way of another example, a command can be received from a component or module of the operating system 104 in response to a user input to the computing device 102 (e.g., a user touching a touchscreen).

On a frame by frame basis, an animation system mode is selected based on the received command (act 304). Various different rules or criteria can be used to select the animation system mode. In one or more embodiments, different sources provide different commands in different situations, and the specific command indicates which animation system mode to select. For example, an application defined animation command can indicate selection of the animation system mode, a user interaction command can indicate selection of the interaction animation system mode, an inertia command can indicate selection of the inertia animation system mode, and a jump command can indicate selection of the jump animation system mode.

Additionally or alternatively, various other rules or criteria can be used to select the animation system mode. For example, a command indicating that a user's finger is no longer touching a touchscreen can be received, and the rules or criteria can indicate selection of the inertia animation system mode.

As discussed above, the selection of the animation system mode is performed on a frame by frame basis. The animation system mode selected for a particular frame may be, but need not be, different than the animation system mode selected for the previous frame.

In response to selection of the application defined animation system mode, the display is updated using key frame animation and/or expression animation (act 306). The display can be updated using key frame animation and/or expression animation by, for example, the animation module 202. Additionally or alternatively, other types of updating supported by the animation module 202 can be used in act 306. Process 300 then returns to either receive another command (act 302) or select the animation system mode for the next frame (act 304).

In response to selection of the user interaction animation system mode, the display is updated using an interaction based system (act 308). The display can be updated using an interaction based system by, for example, the interacting module 204. Additionally or alternatively, other types of updating supported by the interacting module 204 can be used in act 308. Process 300 then returns to either receive another command (act 302) or select the animation system mode for the next frame (act 304).

In response to selection of the inertia animation system mode, the display is updated using a physics-based system (act 310). The display can be updated using a physics-based system by, for example, the physics module 206. Additionally or alternatively, other types of updating supported by the physics module 206 can be used in act 310. Process 300 then returns to either receive another command (act 302) or select the animation system mode for the next frame (act 304).

In response to selection of the jump animation system mode, the display is updated by jumping to a particular data display (act 312). The display can be updated to a particular display by, for example, the direct set module 208. Additionally or alternatively, other types of updating supported by the direct set module 208 can be used in act 310. Process 300 then returns to either receive another command (act 302) or select the animation system mode for the next frame (act 304).

Figure 4:
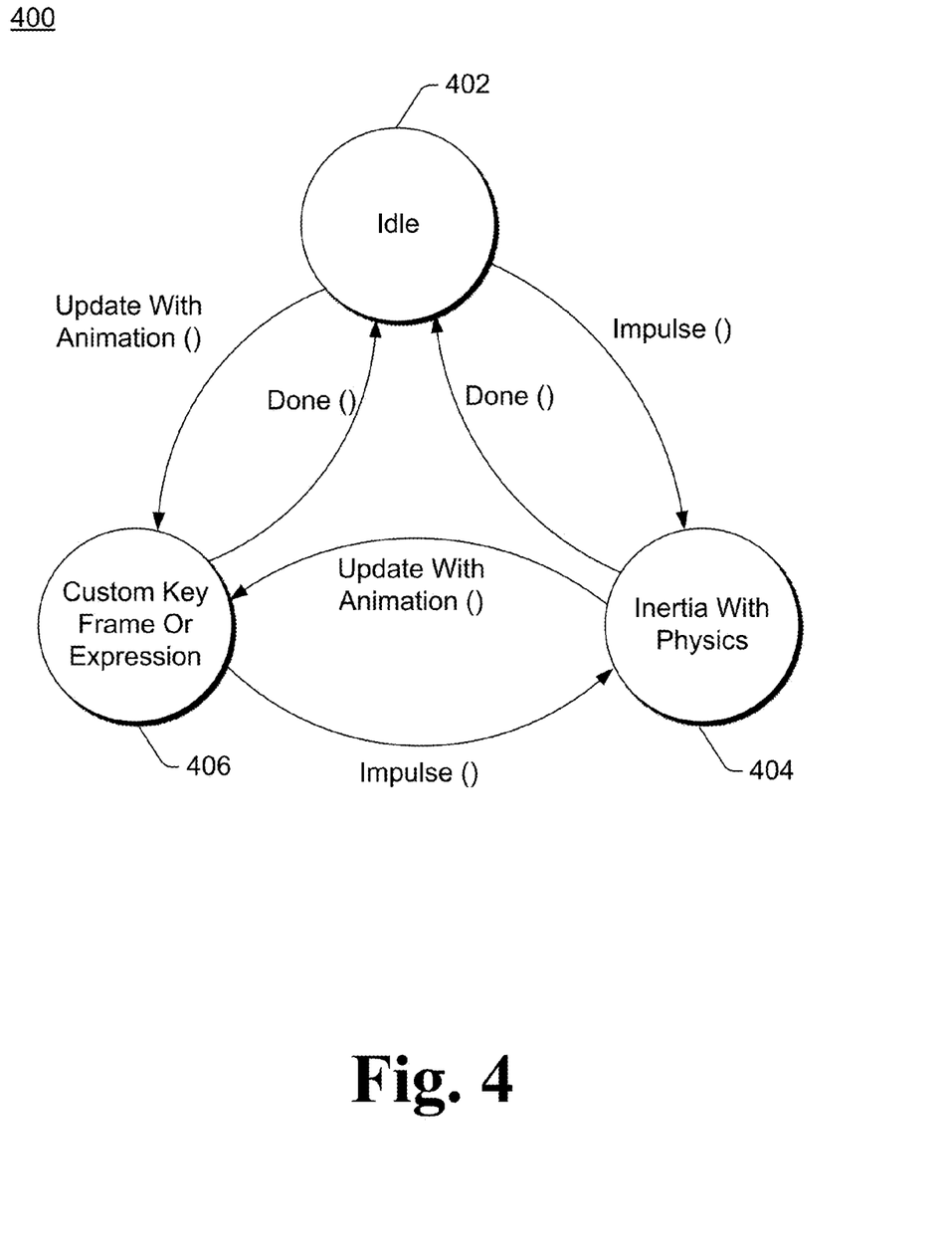
FIG. 4 illustrates an example animation state machine that can be used to implement the multi-mode animation system in accordance with one or more embodiments.

FIG. 4 illustrates an example animation state machine 400 that can be used to implement the multi-mode animation system in accordance with one or more embodiments. The animation state machine 400 can be used to implement, for example, the multi-mode animation system 122 of FIG. 1 or FIG. 2. The animation state machine 400 includes an idle state 402, an inertia with physics state 404, and a custom key frame or expression state 406.

The idle state 402 is a waiting state in which the multi-mode animation system is waiting for a command. The inertia with physics state 404 is a state in which one or more physics-based systems are used to determine updates to the data display for the animation. In the inertia with physics state 404, the inertia animation system mode is selected and the updates to the data display for the animation are performed by the physics module 206.

The custom key frame or expression state 406 is a state in which key frame animation and/or expression animation as defined or specified by the application 106 of FIG. 1 is used to determine updates to the data display for the animation. In the custom key frame or expression state 406, the application defined animation system mode is selected and the updates to the data display for the animation are performed by the animation module 202.

In one or more embodiments, the multi-mode animation system 102 creates an animation state machine 400 for each application 106 of FIG. 1 running on the computing device that presents a user interface on the computing device 102. When the system creates an animation state machine 400 for an application, the animation state machine 400 defaults to the idle state 402 where the multi-mode animation system 122 is waiting for a command. The command can come to the system in various manners, such as from an application, from an external source (e.g., a user input), and so forth.

The command received by the system can be a command indicating to play a particular key frame animation to update the display, a command to update or process a particular expression to update the display, and so forth. In response to such a command (e.g., an application defined animation command), the system transitions to the custom key frame or expression state 406. While in the custom key frame or expression state 406, the system performs the particular key frame animation and/or expression using any of a variety of public and/or proprietary techniques. In response to processing of the command being completed, the multi-mode animation system 122 returns to the idle state 402.

Another command can be an impulse, which essentially is a small bump or jolt of energy into the displayed content that the content display reacts to. In response to an impulse command (e.g., an inertia command), the multi-mode animation system 122 transitions to the inertia with physics state 404 in which one or more physics-based systems are used to determine updates to the data display. The system can transition to the inertia with physics state 404 from the idle state or the custom key frame or expression state 406. In response to an impulse command, the multi-mode animation system 122 stops whatever other animation it may be doing (e.g., in the custom key frame or expression state 406) and transitions to the inertia with physics state 404.

Once in the inertia with physics state 404, the one or more physics-based systems continue to run until the inertia decays down to zero velocity, at which point the multi-mode animation system 122 returns to the idle state 402. If an animation command is received by the multi-mode animation system 122 while in the inertia with physics state, the multi-mode animation system 122 stops updating the display based on the physics-based system and transitions to the custom key frame or expression state 406. Thus, in the process of operation (whether the system is in the idle or inertia with physics state) of the multi-mode animation system 122, if the user begins to interact with the computing device 102 then the multi-mode animation system 122 can interrupt any of the processing in any state and immediately begin to pick up the user input and respond to that seamlessly to what's displayed on screen. The multi-mode animation system 122 seamlessly transitions between any of these states 402, 404, and 406.

Although three states are illustrated in FIG. 4, it should be noted that one or more additional states can optionally be included, such as for a user input state and/or a jump to particular data display state. For example, a fourth state could be a user input (e.g., user gesture) state that corresponds to changes to the display made in response to user inputs (e.g., a gesture to scroll or pan the display). The multi-mode animation system 122 would transition to the user input state in response to any user input (or any user input that the system is responsible for determining how to update or manage the user input rather than the application being responsible for determining how to update or manage the user input). Once handling of the user input is completed, the multi-mode animation system 122 returns to the idle state 402 (or alternatively another state, such as whatever state the system transitioned to the user input state from). Alternatively, the operations for responding to such user input can be handled in another state (e.g., the inertia with physics state 404, or the custom key frame or expression state 406).

Figure 5:
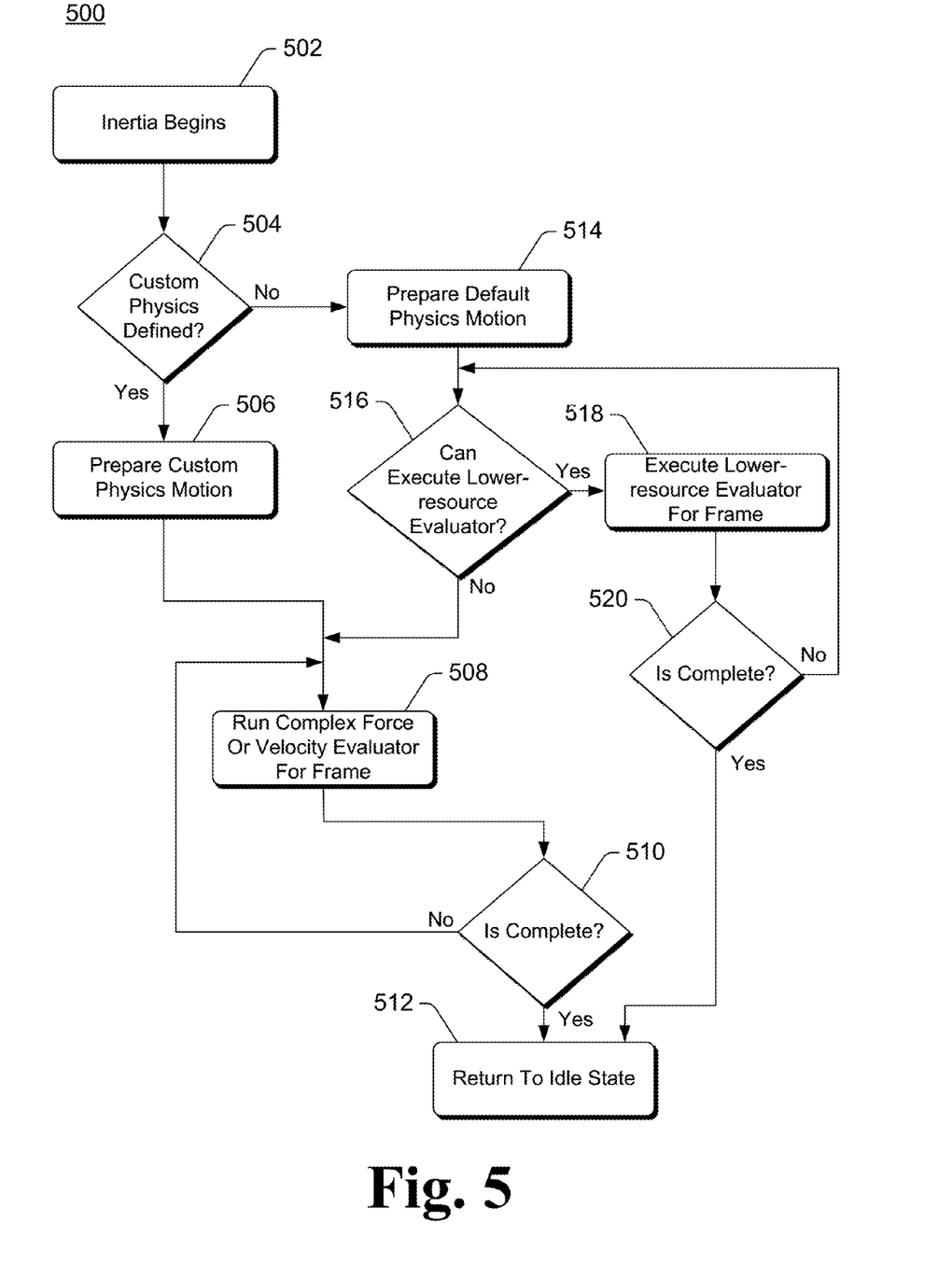
FIG. 5 is a flowchart illustrating an example process for implementing an inertia with physics state in accordance with one or more embodiments.

FIG. 5 is a flowchart illustrating an example process 500 for implementing an inertia with physics state in accordance with one or more embodiments. The inertia with physics state is, for example, the inertia with physics state 404 of FIG. 4. Process 500 is carried out by a multi-mode animation system, such as the multi-mode animation system 122 of FIG. 1 or FIG. 2, and can be implemented in software, firmware, hardware, or combinations thereof. Process 500 is discussed with reference to FIG. 2. Process 500 is shown as a set of acts and is not limited to the order shown for performing the operations of the various acts. Process 500 is an example process for implementing an inertia with physics state; additional discussions of implementing an inertia with physics state are included herein with reference to different figures.

In process 500, the multi-mode animation system has transitioned to the inertia with physics state 404, and the use of one or more physics-based systems to determine updates to the data display for the animation begins (act 502).

A check is made as to whether a custom physics system is defined by the application (act 504). The application 106 can define its own custom physics system to use as the one or more physics-based systems to determine updates to the data display for the animation, or alternatively can rely on one or more default physics-based systems provided by the multi-mode animation system 122 to determine updates to the data display for the animation.

If the application has defined its own custom physics system, then custom physics motion is prepared (act 506). This preparation includes providing the proper configuration and/or system information to the custom physics system (e.g., current position, initial velocity, etc.). In one or more embodiments, although the custom physics system is defined by the application 106, the custom physics system is run by the multi-mode animation system 122. Additionally or alternatively, the custom physics system can be run by the application 106.

A complex force and/or velocity evaluator for the current frame is then run (act 508). In this situation, the complex force and/or velocity evaluator for the current frame is implemented by the custom physics system and is whatever is desired by the designer of the custom physics system.

A check is then made as to whether the running of the one or more physics-based systems to determine updates to the data display for the animation is completed (act 510). Whether the one or more physics-based systems to determine updates to the data display for the animation is completed can be determined in various manners, such as when the inertia decays down to zero velocity.

If the running of the one or more physics-based systems to determine updates to the data display for the animation is completed, then the multi-mode animation system returns to the idle state (act 512). However, if the running of the one or more physics-based systems to determine updates to the data display for the animation is not completed then process 500 returns to act 508 to run the complex force and/or velocity evaluator on the next frame.

Returning to act 504, if the application does not have its own custom physics system defined, then default physics motion is prepared (act 514). This preparation includes providing the proper configuration and/or system information to the default physics system (e.g., current position, initial velocity, etc.).

A check is then made as to whether the default physics system can execute a lower-resource physics motion evaluator (act 516). The lower-resource physics motion evaluator refers to one or more systems or emulators that are more efficient or run using fewer resources than the complex force or velocity evaluator of act 508. Whether the lower-resource physics motion evaluator can be run can be determined based on various different criteria, such as a current location for the animation, whether the animation is at a boundary location (e.g., in which case the lower-resource physics motion evaluator cannot be run), and so forth.

If the default physics system cannot execute a lower-resource physics motion evaluator, then process 500 proceeds to act 508, where a complex force and/or velocity evaluator for the current frame is then. In this situation, the complex force and/or velocity evaluator for the current frame is implemented by the default physics system. Process 500 can then proceed through acts 510 and 508 repeatedly until the running of the one or more default physics-based systems to determine updates to the data display for the animation is completed.

Returning to act 516, if the default physics system can execute a lower-resource physics motion evaluator, then the lower-resource physics motion evaluator is run for the current frame (act 518). The lower-resource physics motion evaluator is implemented by the default physics system.

A check is then made as to whether the running of the one or more physics-based systems to determine updates to the data display for the animation is completed (act 520). Whether the one or more physics-based systems to determine updates to the data display for the animation is completed can be determined in various manners, such as when the inertia decays down to zero velocity.

If the running of the one or more physics-based systems to determine updates to the data display for the animation is completed, then the multi-mode animation system returns to the idle state (act 512). However, if the running of the one or more physics-based systems to determine updates to the data display for the animation is not completed then process 500 returns to act 516 to determine whether the lower-resource physics motion evaluator can be run.

Creating and configuring a physics-based system can be time-consuming and burdensome on the part of the application developer. The techniques discussed in process 500 allow that burden to be alleviated and have updating performed using one or more physics-based systems performed by the multi-mode animation system 122 rather than the application 106.

Thus, using the techniques discussed herein, a user can put his or her finger down while a key frame animation is playing, in response to which the multi-mode animation system can switch from the key frame animation it is playing and have the interacting module generate the animation for display. So, the user touches the touchscreen and the animation immediately begins to interact with and follow the user's finger. The user lifts his or her finger and the multi-mode animation system switches over to the physics module and the animation travels with a little bit of inertia. During that animation display based on the inertia, if the application decides to start another key frame animation at the moment inertia begins or in the middle of inertia, the application can do that and the multi-mode animation system will immediately pick it up based on whatever they describe and update the animation using the animation module.

Furthermore, using the techniques discussed herein, the computing device efficiently animates values using dynamic physics concepts such as velocity and friction, or a predefined curve and duration. Given the current state of the system and input parameters, the animation system selects an appropriate strategy, and can seamlessly change between the modes at any time. By offering at least two main modes (e.g., the animation system mode and the inertia animation system mode), the system allows application developers to easily switch between realistic physics-based motion and a completely customized animation, devoid of the laws of physics (e.g., "cartoon" motions). This allows application developers to, for example, use natural inertia with decay in certain situations and perhaps play a cartoon-like "squishy-bounce" key frame animation in others.

Typically, real-time physics-based animation systems make a tradeoff between flexibility and performance. When choosing flexibility, the system processes motion using a force evaluator (i.e., integrals). In this mode, the engine does more work to calculate a value every frame (typically @ 60 frames per second). When choosing performance, the system uses a fixed set of physics functions/operations to calculate a value every frame. This limits the types of values/motions it can produce. Our system allows for both by using logic/heuristics to determine when to switch between the modes. The transition between the modes is seamless to the user.

During the processing of an animation, the system discussed herein has the ability to dynamically choose the appropriate animation strategy. For example, every animation frame, as long as the configured parameters and current inertia velocity satisfy a closed-form path, the system chooses the appropriate path (e.g., updating the display using a physics-based system). At the moment the system detects a desire to process a more flexible, dynamic portion of the animation (for example, a user-defined spring force at the "logical boundary"), the system switches over to a mode that accurately calculates the value (e.g., updating the display using an application defined animation system mode).

During the processing of an animation, the system discussed herein has the ability to adapt to changes and interruptions, in real-time. If the system detects changes to the configured parameters or the velocity while currently running, the system seamlessly adjusts the mode it uses to process the animation. Similarly, if user input or a stop command is issued, the system can also seamlessly switch from one state to another without producing any visual artifacts or "glitches" on screen.

During the processing of an animation, the system discussed herein has the ability to predict the ending value and allow user-defined motion modifiers. By using a closed-form mode to predict the final value, developers are able to override the "natural" motion and provide a custom force for the system to use instead (e.g., updating the display using an application defined animation system mode).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
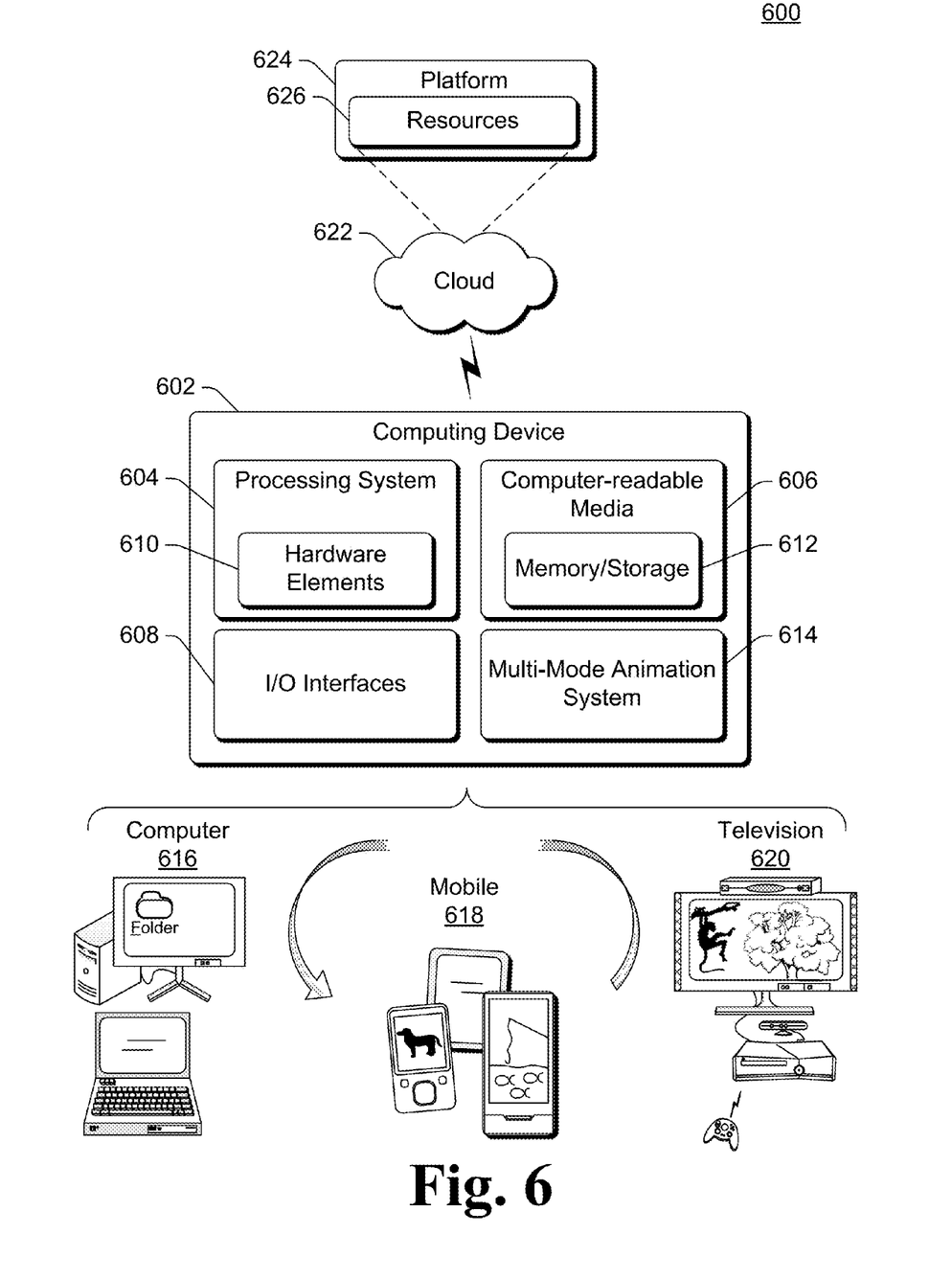
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a multi-mode animation system 614. The multi-mode animation system 614 provides various functionality for using different animation system modes as discussed above. The multi-mode animation system 614 can implement, for example, the multi-mode animation system 122 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: receiving a command for a display system; and on a frame by frame basis for content displayed by the display system as part of a user interface: selecting, based at least on the command, one of multiple animation system modes for the display system; and updating a display of the content for a current frame using the selected animation system mode.

Alternatively or in addition to any of the above described methods, any one or combination of: the multiple animation system modes including an application defined animation system mode, and the updating the display for the current frame using the application defined animation mode comprising key frame animation and/or expression animation as defined or specified by an application of the computing device; the multiple animation system modes including a user interaction animation system mode, and the updating the display for the current frame using the user interaction mode comprising performing one or more operations to respond to a user input to the computing device; the multiple animation system modes including an inertia animation system mode, and the updating the display for the current frame using the inertia mode comprising using one or more physics-based systems to determine updates to the data display for the animation; the multiple animation system modes including a jump animation system mode, and the updating the display for the current frame using the jump mode comprising setting a particular data display for the display system; the method further comprising maintaining a current state for the display system, and making the current state for the display system available to each of the multiple animation system modes; the current state for the display system including a current velocity setting for movement of an animation; the current state for the display system including a current location setting for movement of an animation.

A system comprising: a selection module configured to receive a command for the system and, on a frame by frame basis for content displayed by the system, select one of multiple animation system modes for the system based at least on the command; and an additional module corresponding to the selected animation system mode and configured to update a display of the content for a current frame of the content using the selected animation system mode.

Alternatively or in addition to any of the above described systems, any one or combination of: the additional module comprising an animation module configured to use key frame animation and/or expression animation as defined or specified by an application of the computing device; the additional module comprising an interacting module configured to perform one or more operations to respond to a user input to the computing device; the additional module comprising a physics module configured to use one or more physics-based systems to determine updates to the data display for the animation; the additional module comprising a direct set module configured to set a particular data display for the system; the selection module being further configured to maintain a current state for the system and make the current state for the system available to the additional module.

A computing device comprising: a processor; and a computer-readable storage medium having stored thereon multiple instructions that, responsive to execution by the processor, cause the processor to: receive a command for a display system; and on a frame by frame basis for multiple frames of content displayed by the display system: select, based at least on the command, one of multiple animation system modes for the display system; and update, for each frame of the multiple frames, a display of the content using the selected animation system mode for the frame.

Alternatively or in addition to any of the above described computing devices, any one or combination of: the multiple animation system modes including an application defined animation system mode, wherein to select one of the multiple animation system modes is to select the application defined animation system mode for a first frame of the multiple frames, and wherein to update the display using the selected animation system mode for the first frame is to use key frame animation and/or expression animation as defined or specified by an application of the computing device; the multiple animation system modes further including an inertia animation system mode, wherein to select one of the multiple animation system modes is to select the inertia animation system mode for a second frame of the multiple frames, and wherein to update the display using the selected animation system mode for the second frame is to use one or more physics-based systems to determine updates to the data display for the animation; the multiple animation system modes further including a user interaction animation system mode, wherein to select one of the multiple animation system modes is to select the user interaction animation system mode for a third frame of the multiple frames, and wherein to update the display using the selected animation system mode for the third frame is to perform one or more operations to respond to a user input to the computing device; the multiple animation system modes further including a jump animation system mode, wherein to select one of the multiple animation system modes is to select the jump animation system mode for a fourth frame of the multiple frames, and wherein to update the display using the selected animations system mode for the fourth frame is to set a particular data display for the display system; wherein the multiple instructions further cause the processor to maintain a current state for the display system, the current state for the display system including a current location setting for movement of an animation, and make the current state for the display system available to each of the multiple animation system modes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   receiving a command for a display system; and
   on a frame by frame basis for content displayed by the display system as part of a user interface:
      selecting, from multiple animation system modes for the display system, one of the multiple animation system modes that is indicated by the command, each of the multiple animation system modes operating in a different manner to determine how to change a display for an animation, the multiple animation system modes including at least two animation system modes from the group including an application defined animation system mode that uses key frame animation or expression animation as defined or specified by an application of the computing device, an inertia animation system mode that uses one or more physics-based systems, and a jump animation system mode that jumps to a particular data display, wherein the at least two animation system modes are included in an animation state machine created for each of a plurality of applications running on the computing device; and
      updating the display of the content for a current frame using the selected animation system mode.

2. The method as recited in claim 1, the application defined animation system mode comprising key frame animation as defined or specified by the application of the computing device, the key frame animation being time-based or value-based animation in which particular values for the key frame animation are specified by the application.

3. The method as recited in claim 1, the multiple animation system modes including a user interaction animation system mode, and the updating the display for the current frame using the user interaction animation system mode comprising performing one or more operations to respond to a user input to the computing device.

4. The method as recited in claim 1, the jump animation system mode setting the particular data display for the display system to jump to with no animation.

5. The method as recited in claim 1, further comprising:
   maintaining a current state for the display system; and
   sharing the current state for the display system with each of the multiple animation system modes, each of the multiple animation system modes using data generated or updated by another of the multiple animation system modes.

6. The method as recited in claim 5, the current state for the display system including a current velocity setting for movement of the animation.

7. The method as recited in claim 5, the current state for the display system including a current location setting for movement of the animation.

8. The method as recited in claim 1, the updating further comprising updating the display of the content for a subsequent frame using one of the multiple animation system modes that is different than the selected animation system mode used to update the current frame.

9. A system comprising:
   a selection module including multiple instructions executed to receive a command for the system and, on a frame by frame basis for content displayed by the system, select one of multiple animation system modes for the system, the selected animation system mode being indicated by the command, each of the multiple animation system modes operating in a different manner to determine how to change a display for an animation, the multiple animation system modes including at least two animation system modes from the group including an application defined animation system mode that uses key frame animation or expression animation as defined or specified by an application of the system, an inertia animation system mode that uses one or more physics-based systems, and a jump animation system mode that jumps to a particular data display, wherein the at least two animation system modes are included in an animation state machine created for each of a plurality of applications running on the system; and
   an additional module corresponding to the selected animation system mode and including multiple instructions executed to update the display of the content for a current frame of the content using the selected animation system mode.

10. The system as recited in claim 9, the additional module comprising an animation module including multiple instructions executed to use key frame animation as defined or specified by the application, the key frame animation being time-based or value-based animation in which particular values for the key frame animation are specified by the application.

11. The system as recited in claim 9, the additional module comprising an interacting module including multiple instructions executed to perform one or more operations to respond to a user input to the system.

12. The system as recited in claim 9, the additional module comprising a physics module including multiple instructions executed to use the one or more physics-based systems to update the display of the content.

13. The system as recited in claim 9, the additional module comprising a direct set module including multiple instructions executed to jump to the particular data display for the system.

14. The system as recited in claim 9, each of the multiple animation system modes corresponding to one of multiple modules, the multiple modules including the additional module, and the selection module being further configured to maintain a current state for the system and share the current state for the system with each of the multiple modules.

15. A computing device comprising:
a processor; and
a computer-readable storage medium having stored thereon multiple instructions that, responsive to execution by the processor, cause the processor to:
receive a command for a display system; and
on a frame by frame basis for multiple frames of content displayed by the display system:
select, from multiple animation system modes for the display system, one of the multiple animation system modes that is indicated by the command, each of the multiple animation system modes operating in a different manner to determine how to change a display for an animation, the multiple animation system modes including at least two animation system modes from the group including an application defined animation system mode that uses key frame animation or expression animation as defined or specified by an application of the computing device, an inertia animation system mode that uses one or more physics-based systems, and a jump animation system mode that jumps to a particular data display, wherein the at least two animation system modes are included in an animation state machine created for each of a plurality of applications running on the computing device; and
update, for each frame of the multiple frames, the display of the content using the selected animation system mode for the frame.

16. The computing device as recited in claim 15, wherein to select one of the multiple animation system modes is to select the application defined animation system mode for a first frame of the multiple frames, and wherein to update the display using the selected animation system mode for the first frame is to use the expression animation as defined or specified by the application of the computing device, the expression animation being an animation that changes based on a displayed component that the animation is tied to.

17. The computing device as recited in claim 16, wherein to select one of the multiple animation system modes is to select the inertia animation system mode for a second frame of the multiple frames, and wherein to update the display using the selected animation system mode for the second frame is to use the one or more physics-based systems to determine updates to the display of the content.

18. The computing device as recited in claim 17, the multiple animation system modes further including a user interaction animation system mode, wherein to select one of the multiple animation system modes is to select the user interaction animation system mode for a third frame of the multiple frames, and wherein to update the display using the selected animation system mode for the third frame is to perform one or more operations to respond to a user input to the computing device.

19. The computing device as recited in claim 18, wherein to select one of the multiple animation system modes is to select the jump animation system mode for a fourth frame of the multiple frames, and wherein to update the display using the selected animation system mode for the fourth frame is to jump to a data display for the display system.

20. The computing device as recited in claim 15, wherein the multiple instructions further cause the processor to:
maintain a current state for the display system, the current state for the display system including a current location setting for movement of the animation; and
share the current state for the display system with each of the multiple animation system modes, each of the multiple animation system modes using data generated or updated by another of the multiple animation system modes.

* * * * *